(12) United States Patent
Abelha Ferreira et al.

(10) Patent No.: US 11,893,817 B2
(45) Date of Patent: Feb. 6, 2024

(54) METHOD AND SYSTEM FOR GENERATING DOCUMENT FIELD PREDICTIONS

(71) Applicant: EMC IP Holding Company LLC, Hopkinton, MA (US)

(72) Inventors: Paulo Abelha Ferreira, Rio de Janeiro (BR); Pablo Nascimento da Silva, Niterói (BR); Rômulo Teixeira de Abreu Pinho, Niterói (BR); Tiago Salviano Calmon, London (GB); Vinicius Michel Gottin, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 254 days.

(21) Appl. No.: 17/386,386

(22) Filed: Jul. 27, 2021

(65) Prior Publication Data
US 2023/0031202 A1 Feb. 2, 2023

(51) Int. Cl.
*G06F 30/00* (2020.01)
*G06V 30/412* (2022.01)
*G06F 16/35* (2019.01)
*G06V 30/413* (2022.01)
*G06V 30/414* (2022.01)
*G06F 18/214* (2023.01)

(52) U.S. Cl.
CPC ............ *G06V 30/412* (2022.01); *G06F 16/35* (2019.01); *G06F 18/214* (2023.01); *G06V 30/413* (2022.01); *G06V 30/414* (2022.01)

(58) Field of Classification Search
CPC .. G06V 30/412; G06V 30/413; G06V 30/414; G06F 16/35; G06F 18/214
See application file for complete search history.

(56) References Cited

U.S. PATENT DOCUMENTS

| | | | |
|---|---|---|---|
| 10,339,375 B2* | 7/2019 | Castillo | G06V 30/413 |
| 10,467,464 B2* | 11/2019 | Chen | G06V 30/412 |
| 11,609,959 B2* | 3/2023 | Feng | G06F 16/248 |
| 2017/0351913 A1* | 12/2017 | Chen | G06V 30/412 |
| 2018/0260370 A1* | 9/2018 | Riediger | G06F 17/00 |
| 2020/0364451 A1* | 11/2020 | Ammar | G06V 10/768 |
| 2021/0150338 A1* | 5/2021 | Semenov | G06F 18/24765 |

(Continued)

*Primary Examiner* — William L Bashore
*Assistant Examiner* — David Faber
(74) *Attorney, Agent, or Firm* — Chamberlain, Hrdlicka, White, Williams & Aughtry; Aly Z. Dossa

(57) ABSTRACT

Techniques described herein relate to a method for predicting field values of documents. The method may include identifying a field prediction model generation request; obtaining, training documents from a document manager; selecting a first training document; making a first determination that the first training document is a text-based document; performing text-based data extraction to identify first words and first boxes included in the first training document; identifying first keywords and first candidate words included in the first training document based on the first words and the first boxes; and generating a first annotated training document using the first keywords and the first candidate words, wherein the first annotated training document comprises color-based representation masks for the first keywords, the first candidate words, and first general words included in the first training document.

20 Claims, 7 Drawing Sheets

(56) References Cited

U.S. PATENT DOCUMENTS

| | | | | |
|---|---|---|---|---|
| 2021/0357633 A1* | 11/2021 | Bade | ................... | G06F 40/284 |
| 2022/0035990 A1* | 2/2022 | Kaza | ................... | G06F 18/214 |
| 2022/0198182 A1* | 6/2022 | Semenov | ................ | G06F 40/30 |
| 2022/0335073 A1* | 10/2022 | Semenov | ............. | G06F 16/3347 |
| 2022/0414328 A1* | 12/2022 | Nguyen | ............... | G06V 30/414 |

\* cited by examiner

Example Annotated Training Document 330

| Keyword A: Green A 332 | Candidate Word A: Blue 334 | | Keyword B: Green B 336 |
|---|---|---|---|
| | General Word A: White 338 | General Word B: White 340 | General Word C: White 342 |
| Keyword C: Green C 344 | General Word D: Blue 346 | Candidate Word B: Blue (Field Prediction, Actual Field Value) 348 | |
| | | | General Word E: White 350 |
| Keyword D: Green D 352 | Candidate Word C: Blue 354 | | General Word F: White 356 |
| General Word G: White 358 | General Word H: White 360 | | |

FIG. 3B ized, by the document annotator, text-based data extraction to identify first words and first boxes included in the first training document; identifying, by the document annotator, first keywords and first candidate words included in the first training document based on the first words and first boxes, wherein the first keywords specify words associated with a field, and wherein the first candidate words specify potential field values of the field; and generating, by the document annotator, a first annotated training document using the first keywords and the first candidate words, wherein the first annotated training document comprises color-based representation masks for the first keywords, the first candidate words, and first general words included in the first training document.

METHOD AND SYSTEM FOR GENERATING DOCUMENT FIELD PREDICTIONS

BACKGROUND

Computing devices may include functionality to process information in order to provide services. To provide the services, the computing devices may extract information from data structures. The extracted information may be required to perform the services. Computing devices may be configured to extract information from data structures.

SUMMARY

In general, certain embodiments described herein relate to a method for predicting field values of documents. The method may include identifying, by a document annotator, a field prediction model generation request; in response to identifying the field prediction model generation request: obtaining, by the document annotator, training documents from a document manager; selecting, by the document annotator, a first training document of the training documents; making a first determination, by the document annotator, that the first training document is a text-based document; and in response to the first determination: performing, by the document annotator, text-based data extraction to identify first words and first boxes included in the first training document; identifying, by the document annotator, first keywords and first candidate words included in the first training document based on the first words and first boxes, wherein the first keywords specify words associated with a field, and wherein the first candidate words specify potential field values of the field; and generating, by the document annotator, a first annotated training document using the first keywords and the first candidate words, wherein the first annotated training document comprises color-based representation masks for the first keywords, the first candidate words, and first general words included in the first training document.

In general, certain embodiments described herein relate to a non-transitory computer readable medium that includes computer readable program code, which when executed by a computer processor enables the computer processor to perform a method for predicting field values of documents. The method may include identifying, by a document annotator, a field prediction model generation request; in response to identifying the field prediction model generation request: obtaining, by the document annotator, training documents from a document manager; selecting, by the document annotator, a first training document of the training documents; making a first determination, by the document annotator, that the first training document is a text-based document; and in response to the first determination: performing, by the document annotator, text-based data extraction to identify first words and first boxes included in the first training document; identifying, by the document annotator, first keywords and first candidate words included in the first training document based on the first words and first boxes, wherein the first keywords specify words associated with a field, and wherein the first candidate words specify potential field values of the field; and generating, by the document annotator, a first annotated training document using the first keywords and the first candidate words, wherein the first annotated training document comprises color-based representation masks for the first keywords, the first candidate words, and first general words included in the first training document.

In general, certain embodiments described herein relate to a system for predicting field values of documents. The system includes a field prediction system. The field prediction system includes a document annotator that includes a processor and memory, and is configured to identify a field prediction model generation request; in response to identifying the field prediction model generation request: obtain training documents from a document manager; select a first training document of the training documents; make a first determination that the first training document is a text-based document; and in response to the first determination: perform text-based data extraction to identify first words and first boxes included in the first training document; identify first keywords and first candidate words included in the first training document based on the first words and first boxes, wherein the first keywords specify words associated with a field, and wherein the first candidate words specify potential field values of the field; and generate a first annotated training document using the first keywords and the first candidate words, wherein the first annotated training document comprises color-based representation masks for the first keywords, the first candidate words, and first general words included in the first training document.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 3A-3B show an example in accordance with one or more embodiments of the invention.

DETAILED DESCRIPTION

Figure 1:
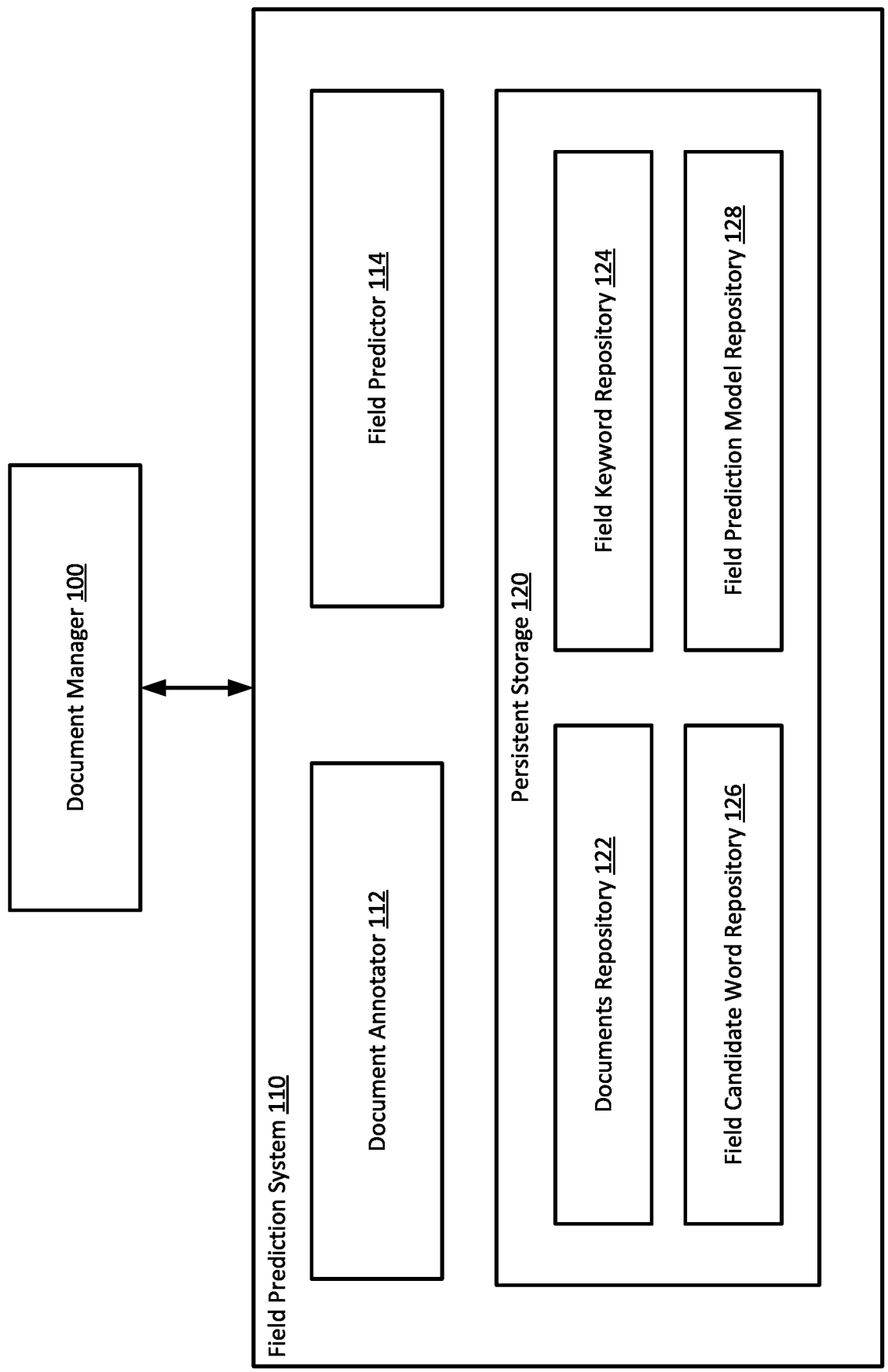
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments of the invention relate to methods, systems, and non-transitory computer readable mediums for predicting fields of documents.

In one or more embodiments, large quantities of documents may be obtained by a document manager from clients that obtain services from the document manager and/or users of the document manager. A field of a document may be a specific type of information included in a document (e.g., part number, order number, shipping address, etc.) and a field value may be the data associated with the particular type of information. For example, for the field of part number, the field value may be any set of numeric characters (e.g., 123456789). To provide the aforementioned services, a user of the document manager may be required to extract information from the obtained documents. Such information may be referred to herein as field values. The extraction of such field values may be required to perform the services for the clients. The process of manually extracting field values from the large quantity of documents by users of the document manager may be very labor intensive and/or very time intensive. Additionally, the large quantity of documents processed by a user of the data manager may be unstructured. In other words, each document obtained by the data manager may be different types of documents, include different types of fields, etc. Furthermore, the large quantity of documents may be associated with high layout variability in which each client or each user of a client may be associated with documents that have different pre-defined layouts compared to the documents associated with other clients.

To address, at least in part, the aforementioned problems that may arise when extracting field values from documents, in one or more embodiments of the invention, a field prediction system includes a document annotator that generates annotated documents using documents obtained from the document manager. As an example, an annotated document may include color-coded representation masks associated with keywords and candidate words that may be associated with a particular field of interest and general words that are unlikely to be associated with the particular field of interest. The field prediction system may further include a field predictor that may use the annotated documents to train field prediction models and to generate field predictions.

In one or more embodiments of the invention, the document annotator generates annotated documents that may be used to train field prediction models, resulting in field prediction models that may accurately and efficiently predict field values in highly variable and unstructured documents with minimal user involvement.

FIG. 1 shows a diagram of a system in accordance with one or more embodiments of the invention. The system may include a document manager (100) and a field prediction system (110). The system may include other and/or additional devices and/or components (e.g., clients) without departing from the invention. The devices and components of the system illustrated in FIG. 1 may be operatively connected via any combinations of wired (e.g., Ethernet) and/or wireless (e.g., WAN) connections without departing from the invention. Each of the aforementioned components of the system in FIG. 1 is discussed below.

In one or more embodiments of the invention, the document manager (100) includes the functionality to perform document management services. Document management services may include (i) obtaining documents from entities not illustrated in FIG. 1 (e.g., clients), (ii) providing documents to the field prediction system (110) for field prediction model training and/or field prediction generation, (iii) sending requests to generate field prediction models and/or field predictions to the field prediction system (110), (iv) obtaining field predictions from the field prediction system (110), and (v) providing field predictions to a user of the document manager (100). Document management services may include other and/or additional services associated with documents without departing from the invention. The document manager (100) may include other and/or additional functionalities without departing from the invention.

In one or more embodiments of the invention, the document manager (100) is implemented as a computing device. In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments of the invention, field prediction system (110) includes the functionality to perform field prediction services. The field prediction services may include training field prediction models and generating field predictions using the field prediction models. The field prediction services may include other and/or additional services associated with the generation of field predictions without departing from the invention. The field prediction system (110) may include other and/or additional functionalities without departing from the invention.

In one or more embodiments of the invention, the field prediction system (110) is implemented as a computing device. The computing device may be an embodiment of the computing device discussed above.

In one or more embodiments of the invention, to provide the aforementioned field prediction generation services, the field prediction system (110) includes a document annotator (112), a field predictor (114), and persistent storage (120). The field prediction system (110) may include other and/or additional components without departing from the invention. Each of the aforementioned components of the field prediction system (110) is discussed below.

In one or more embodiments of the invention, the document annotator (112) includes the functionality to perform document annotation services. The document annotation services may include generating annotated training documents and annotated live documents. The document annotator (112) may provide annotated training documents to the field predictor (114) to generate field prediction models. The document annotator (112) may also provide annotated live documents to the field predictor (114) to generate field predictions. The document annotator (112) may include the functionality to perform a portion of the methods illustrated in FIGS. 2A-2C without departing from the invention. The document annotator may include other and/or additional functionalities without departing from the invention. For additional information regarding the functionality of the document annotator (112), refer to FIGS. 2A-2C.

In one or more embodiments of the invention, the document annotator (112) is implemented as computer instructions, e.g., computer code, stored on a persistent storage (e.g., 120) of the field prediction system (110) that when executed by a processor, hardware controller, or other component of the field prediction system (110) cause the field prediction system (110) to provide the functionality of the document annotator (112) described throughout this application.

In one or more embodiments of the invention, the document annotator (112) is implemented using one or more computing devices (discussed above) operatively connected to the field prediction system (110) and/or components of the field prediction system (110).

In one or more embodiments of the invention, the field predictor (114) includes the functionality to generate field prediction models and field predictions. To generate field prediction models, the field predictor (114) may use annotated training documents obtained from the document annotator (112). To generate field predictions, the field predictor (114) may use annotated live documents obtained from the document annotator (112) and field prediction models. The field predictor (114) may include the functionality to perform a portion of the methods illustrated in FIGS. 2A-2C. The field predictor (114) may include other and/or additional functionalities without departing from the invention. For additional information regarding the functionality of the field predictor (114), refer to FIGS. 2A-2C.

In one or more embodiments of the invention, the field predictor (114) is implemented as computer instructions, e.g., computer code, stored on a persistent storage (e.g., 120) of the field prediction system (110) that when executed by a processor, hardware controller, or other component of the field prediction system (110) cause the field prediction system (110) to provide the functionality of the field predictor (114) described throughout this application.

In one or more embodiments of the invention, the field predictor (114) is implemented using one or more computing devices (discussed above) operatively connected to the field prediction system (110) and/or components of the field prediction system (110).

In one or more embodiments of the invention, the persistent storage (120) includes the functionality to provide data storage services to the document annotator (112), the field predictor (114), and other and/or additional components of the field prediction system (110) or entities not illustrated in FIG. 1. The data storage services may include storing and/or providing data. The data storage services may include other and/or additional services without departing from the invention. The persistent storage (120) may store any quantity and/or type of data without departing from the invention.

The persistent storage (120) may store a documents repository (122), a field keyword repository (124), a field candidate word repository (126), and a field prediction model repository (128). The persistent storage (120) may store other and/or additional types of data and/or information without departing from the invention. Each of the aforementioned types of data stored in the persistent storage (120) is discussed below.

In one or more embodiments of the invention, the documents repository (122) includes one or more data structures that include documents. A document may be a data structure (e.g., a file) that includes data that may be used to perform services for users of the system (e.g., clients). Documents may include purchase orders, inventory manifests, and other and/or additional types of documents without departing from the invention. The documents repository (122) may include training documents and live documents. Training documents may include documents that have been processed and include a reference to the one or more field values of interest associated with the document. Training documents may be used to train and verify field prediction models. Live documents may include documents that have not been processed and do not include a reference to the one or more fields values of interest associated with the document. The training documents and the live documents may be obtained from the document manager (100) and/or other entities not illustrated in the system of FIG. 1. The documents of the document repository (122) may be text-based documents (e.g., text files, text-based portable document format (PDF) files, etc.) that include text data or image-based documents (e.g., image files, scanned PDF files, etc.) that include image data. The document annotator (112) may generate annotated documents using the documents of the document repository (122) by generating color masks based on field keywords, field candidate words, and general words included in the document. The document repository (122) may include other and/or additional data and may be used for other and/or additional purposes without departing from the invention.

In one or more embodiments of the invention, the field keyword repository (124) includes one or more data structures that include keywords associated with fields. The field keyword repository (124) may include any number of entries associated with any number of fields of interest. Each entry of the field keyword repository (124) may include a field identifier and a set list of all pre-defined keywords associated with the field. A keyword may be a combination of alphanumeric characters associated with a field. For example, for the field of shipping address, the keywords may include "address," "shipping," "street name," "place of residence," etc. The list of keywords included in each entry of the field keyword repository (124) may be defined by and obtained from a user of the document manager (100) (i.e., the user may be an expert regarding the field). The keywords included in the field keyword repository (124) may be used by the document annotator (112) to generate annotated training documents and annotated live documents. The field keyword repository (124) may include other and/or additional information and may be used for other and/or additional purposes without departing from the invention.

In one or more embodiments of the invention, the field candidate word repository (126) includes one or more data structures that include candidate words associated with fields. The field candidate word repository (126) may include any number of entries associated with any number of fields of interest. Each entry of the field candidate repository may include a field identifier associated with the field and a list of alphanumeric character parameters associated with the field value. A candidate word may be a set of alphanumeric characters that satisfy the alphanumeric character parameters associated with a field value. The alphanumeric character parameters may specify requirements for the field value (e.g., character length, number of numeric characters included, number of alphabetic characters included, etc.). For example, for the field of part number, the alphanumeric character parameters included in the candidate word repository associated with part number may specify that candidate words may include only numeric characters and may include between five and ten numeric characters. The alphanumeric character parameters of the candidate word repository may be defined by and obtained from a user of the document manager (100) (i.e., the user may be an expert regarding the field). The alphanumeric parameters included in the field candidate word repository (126) may be used by the document annotator (112) to generate annotated training documents and annotated live documents. The field candidate word repository (126) may include other and/or additional information and may be used for other and/or additional purposes without departing from the invention.

In one or more embodiments of the invention, the field prediction model repository (128) is one or more data structures that include any number of field prediction models. Each field prediction model may be associated with a single field (i.e., a prediction model may only be able to generate field predictions for a single field). The field prediction models may be generated by the field predictor (114) and used by the field predictor (114) to generate field predictions. The field prediction models may be, for example, a prediction model generated by applying training documents to a deep learning prediction algorithm. The deep learning prediction algorithm may be any type of deep learning prediction algorithm (e.g., neural network prediction algorithm) without departing from the invention. The field prediction model repository (128) may include other and/or additional data and may be used for other and/or additional purposes without departing from the invention.

While the data structures (e.g., 122, 124, 126, 128) are illustrated as separate data structures and have been discussed as including a limited amount of specific information, any of the aforementioned data structures may be divided into any number of data structures, combined with any number of other data structures, and may include additional, less, and/or different information without departing from the invention. Additionally, while illustrated as being stored in the persistent storage (120), any of the aforementioned data structures may be stored in different locations (e.g., in persistent storage of other computing devices and/or spanned across any number of computing devices) without departing from the invention.

The persistent storage (120) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (120) may utilize portions of any combination of hard disk drives, solid state disk drives, tape drives, and/or any other physical storage medium of any number of computing devices.

While FIG. 1 shows a configuration of components, other configurations may be used without departing from the scope of embodiments described herein. Accordingly, embodiments disclosed herein should not be limited to the configuration of components shown in FIG. 1.

Figure 2A:
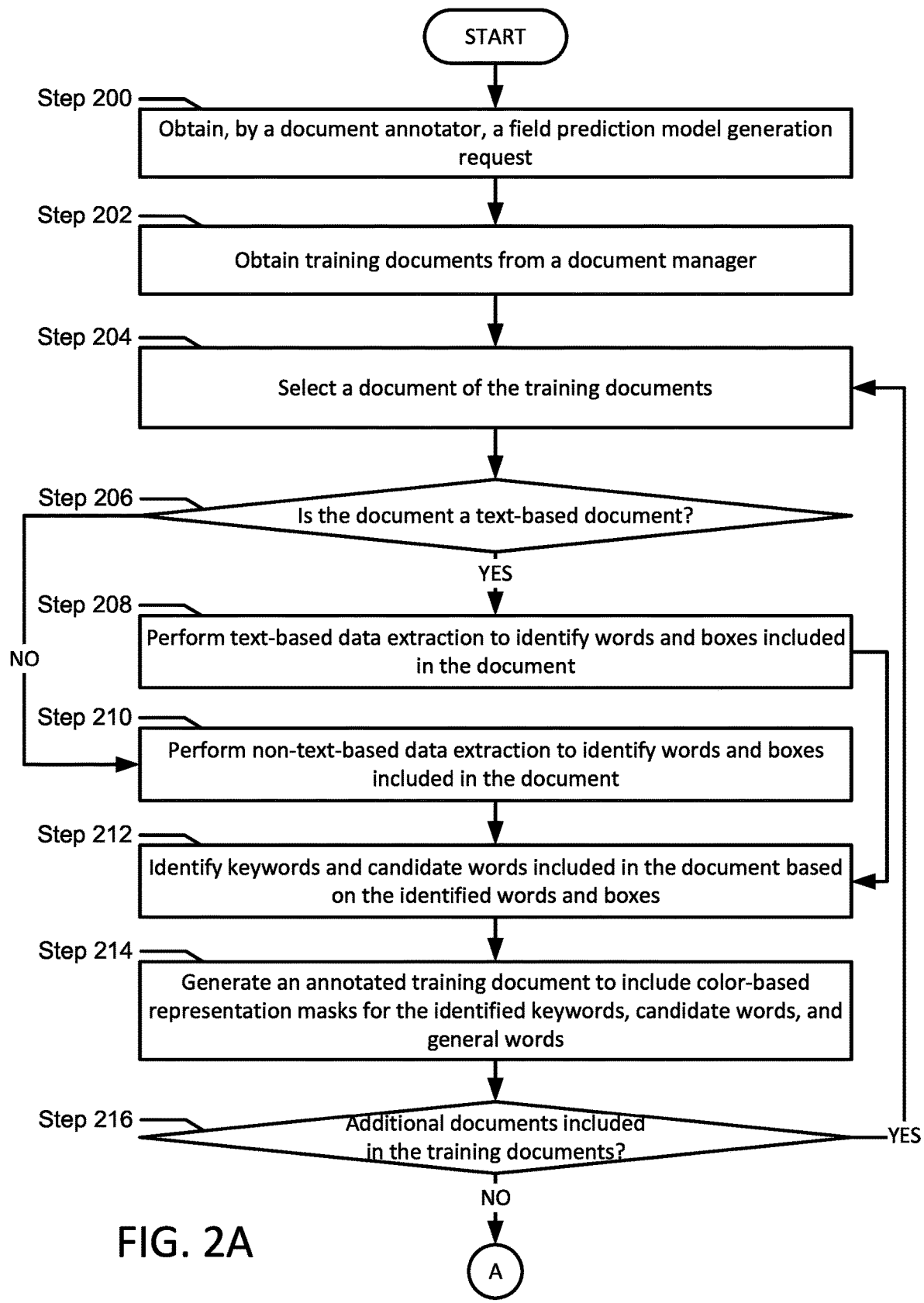
FIGS. 2A-2B show a flowchart in accordance with one or more embodiments of the invention.
Figure 2B:
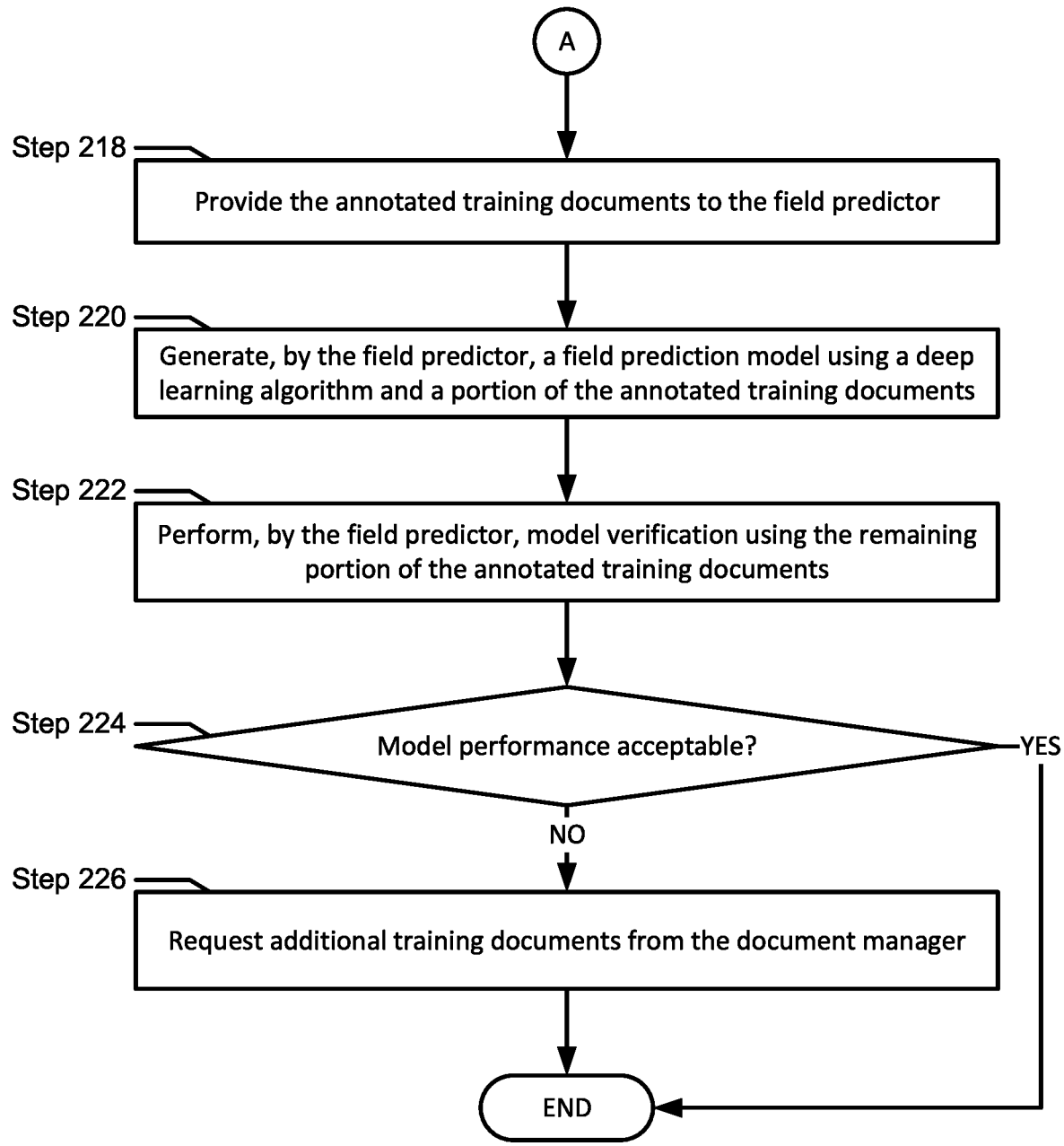

FIGS. 2A-2B show a flowchart in accordance with one or more embodiments of the invention. The flowchart may describe a method for generating a field prediction model in accordance with one or more embodiments of the invention.

While the various steps in the flowchart shown in FIGS. 2A-2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Turning to FIG. 2A, in Step 200, the document annotator obtains a field prediction model generation request. In one or more embodiments of the invention, the field prediction model generation request is provided to the document annotator by the document manager using any appropriate method of data transmission without departing from the invention. As an example, the document manager may communicate the field prediction model generation request as network data traffic units over a series of network devices that operatively connect to the document manager and the document annotator. The field prediction model generation request may include the field identifier associated with the field in which field prediction model will predict the field value.

In Step 202, training documents are obtained from the document manager. In one or more embodiments of the invention, the document annotator sends a request for training documents to the document manager. The training documents request may be sent to the document manager using any appropriate method of data transmission without departing from the invention. As an example, the document annotator may communicate the training documents request as network data traffic units over a series of network devices that operatively connect to the document annotator and the document manager.

In one or more embodiments of the invention, in response to obtaining the training documents request from the document annotator, the document manager may obtain training documents and send the training documents to the document annotator. In one or more embodiments of the invention, the training documents are provided to the document annotator by the document manager using any appropriate method of data transmission without departing from the invention. As an example, the document manager may communicate the training documents as network data traffic units over a series of network devices that operatively connect to the document manager and the document annotator. As another example, the document manager may perform network file transfers using any network file transfer protocol.

In Step 204, a document of the training documents is selected by the document annotator. In one or more embodiments of the invention, the document annotator selects a document that has not previously been selected. If it is the first selected document, then any document of the training documents may be selected. Once a document is selected, the document annotator may indicate that the document has been selected by, for example, setting a flag, tagging the document etc.

In Step 206, a determination is made as to whether the selected document is a text-based document. As discussed above the documents may be text-based document or image-based documents. Text-based documents may include text data and image-based documents may include image data. The document annotator may determine whether the document is a text-based document by checking the data included in the document.

In one or more embodiments of the invention, if the document annotator identifies that the document includes text data, then the document annotator may determine that document is a text-based document. In one or more embodiments of the invention, if the document annotator identifies that the document does not include text data (i.e., the document includes image data), then the document annotator may determine that the document is not a text-based document (i.e., the document is an image-based document).

In one or more embodiments of the invention, if the document annotator determines that the document is a text-based document, then the method proceeds to Step 208. In one or more embodiments of the invention, if the document annotator determines that the document is not a text-based document, then the method proceeds to Step 210.

In step 208, the document annotator performs text-based data extraction to identify words and boxes included in the document. The document annotator may perform any appropriate method of text-based data extraction without departing from the invention. As an example, the document annotator may use pdfplummer to perform text-based data extraction. As a result, the document annotator may identify every word (i.e., set of alphanumeric characters) included in the document and box associated with each word. A box may specify the location of a word in the document. The location may include positional information relative to the document and page size (e.g., page coordinates associated with each corner of a rectangular box).

In one or more embodiments of the invention, the method proceeds to Step 212 following step 208.

In step 210, the document annotator performs non-text-based data extraction to identify words and boxes included in the document. The non-text-based data extraction may include image-based data extraction. The document annotator may perform any appropriate method of non-text-based data extraction without departing from the invention. As an example, the document annotator may use optical character recognition techniques to perform non-text-based data extraction. As a result, the document annotator may identify every word (i.e., set of alphanumeric characters) included in the document and a box associated with each word. A box may specify the location of a word in the document. The location may include positional information relative to the document and page size (e.g., page coordinates associated with each corner of a rectangular box).

In step 212, the document annotator identifies keywords and candidate words included in the document using the identified words and boxes. In one or more embodiments of the invention, the document annotator uses the list of keywords associated included in the entry of the field keyword repository associated with the field identifier included in the field prediction model generation request obtained in Step 200 to identify keywords. The document annotator may identify any word included in the document that matches a keyword of the list of keywords as a keyword and may specify which keyword it matches.

In one or more embodiments of the invention, the document annotator uses the alphanumeric character parameters included in the entry of the field candidate word repository associated with the field identifier included in the field prediction model generation request obtained in Step 200 to identify candidate words. The document annotator may identify any word included in the document that satisfies the alphanumeric character parameters as a candidate word.

In Step 214, an annotated training document is generated to include color-based representation masks for the identified keywords, the identified candidate words, and general words. In one or more embodiments of the invention, the document annotator generates color-based representation masks by coloring the boxes associated with the identified keywords, the identified candidate words, and general words. The document annotator may color keywords a first color, candidate words a second color, and general words (i.e., all words that are not keywords or candidate words) a third color. The document annotator may color each keyword included in the document a different shade of the first color. The field keyword repository entry associated with the field may specify a shade of the first color associated with each keyword included in the list of keywords. For example, all candidate words may be colored blue, all general words may be colored white, and each keyword may be colored a different shade of green.

In Step 216, a determination is made as to whether the training documents includes additional documents. As discussed above, the document annotator may indicate when a document is selected. In one or more embodiments of the invention, the document annotator checks the training documents to identify a training document that is not indicated as a previously selected document.

In one or more embodiments of the invention, if the document annotator identifies a training document that is not indicated as a previously selected document, then the document annotator may determine that there are additional documents included in the training documents. In one or more embodiments of the invention, if the document annotator does not identify any training documents that are not indicated as previously selected documents, then the document annotator may determine that there are no additional documents included in the training documents.

In one or more embodiments of the invention, if it is determined that there are additional documents included in the training documents, then the method proceeds to step 204. In one or more embodiments of the invention, if it is determined that there are no additional documents included in the training documents, then the method proceeds to step 218 of FIG. 2B.

Turning to FIG. 2B, in Step 218, the annotated training documents are provided to the field predictor. In one or more embodiments of the invention, the document annotator provides the annotated training documents to the field predictor. The annotated training documents may be sent to the field predictor using any appropriate method of data transmission without departing from the invention. As an example, the document annotator may communicate the annotated training documents as network data traffic units over a series of network devices that operatively connect to the document annotator and the field predictor. As another example, the document annotator may perform network file transfers using any network file transfer protocol. As a further example, the document annotator may store the annotated training documents in the document repository of the persistent storage of the field prediction system. The document annotator may provide references (e.g., pointers) to the annotated training documents to the field predictor.

In Step 220, the field predictor generates a field prediction model using a deep learning algorithm and a portion of the annotated training documents. In one or more embodiments of the invention, the field predictor introduces to the deep learning algorithm to the portion of the training documents to generate the field prediction model. The field predictor may perform any appropriate method of model training to generate the field prediction model. As a result, the field prediction model may be generated.

In Step 222, the field predictor performs model verification using the remaining portion of the annotated training documents. Any appropriate method of model verification may be performed without departing from the invention. As an example, the field predictor may apply the field prediction model to the remaining portion of the annotated training documents to generate field predictions. The field predictor may compare the generated field predictions and the real field values indicated by the training documents to identify the number of incorrect field predictions. The field predictor may use the total number of field predictions and the number of incorrect field predictions to calculate an error percentage (i.e., percentage of incorrect field predictions).

In Step 224, the field predictor makes a determination as to whether the performance of the generated field prediction model is acceptable. In one or more embodiments of the invention, any appropriate method of determining whether the model performance of the generated field prediction model may be performed without departing from the invention. As an example, the field predictor may compare the error rate calculated above in Step 224 to an error rate threshold. If the field predictor identifies that the error rate is above the error rate threshold, then the field predictor may determine that the model performance of the generated field prediction model is not acceptable. If the field predictor identifies that the error rate is below the error rate threshold, then the field predictor may determine that the model performance of the generated field prediction model is acceptable.

In one or more embodiments of the invention, if the field predictor determines that the model performance is acceptable, then the method ends following Step 224. In one or more embodiments of the invention, if the field predictor determines that the model performance is not acceptable, then the method proceeds to Step 226.

In Step 226, the field predictor sends a request for additional training documents to the document manager. In one or more embodiments of the invention, the data annotator and the field predictor may repeat the methods described above in FIGS. 2A-2B with additional training data to generate an improved field prediction model.

In one or more embodiments of the invention, the method ends following step 226.

Figure 2C:
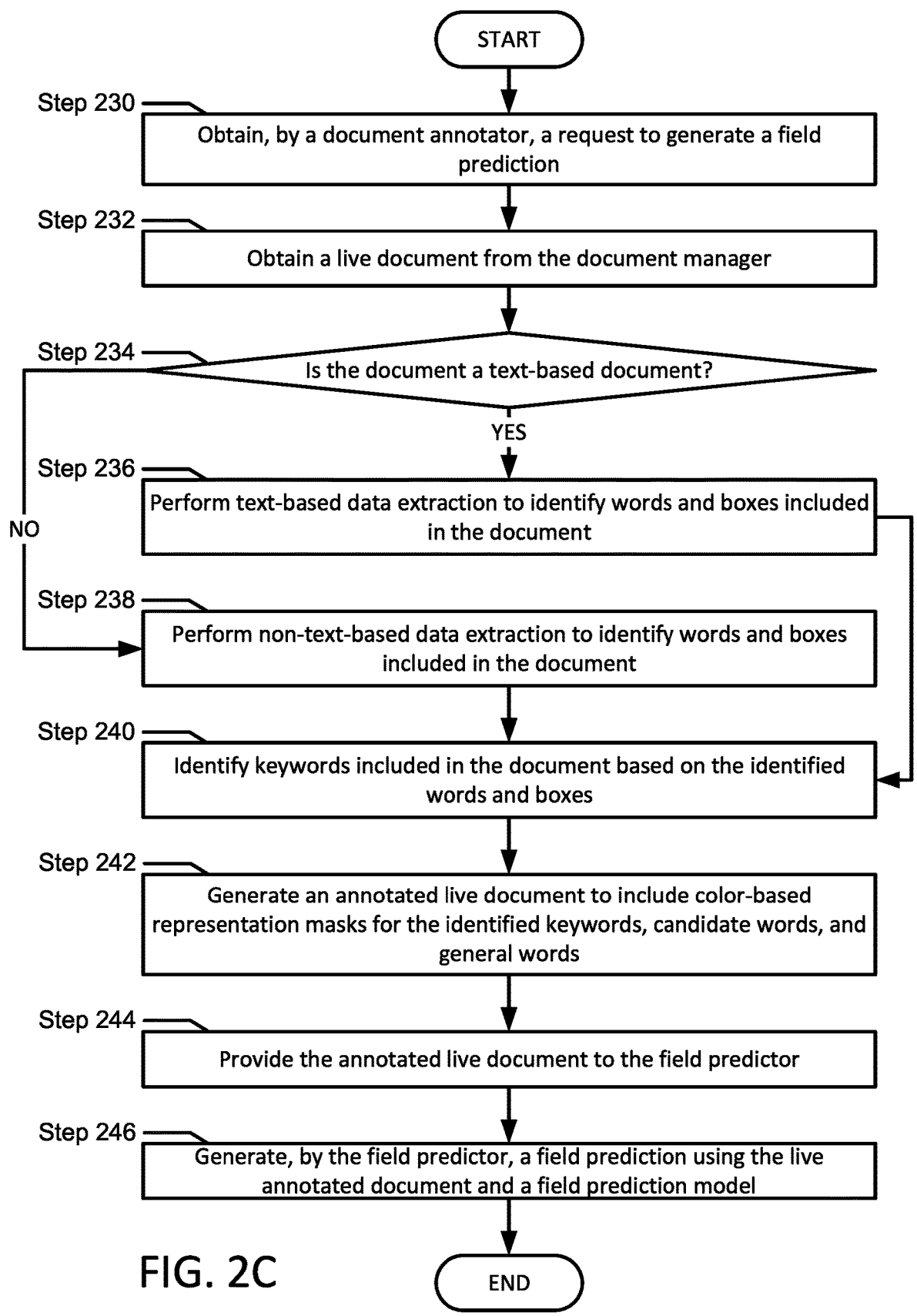
FIG. 2C shows a flowchart in accordance with one or more embodiments of the invention.

FIG. 2C shows a flowchart in accordance with one or more embodiments of the invention. The flowchart may describe a method for generating a field prediction in accordance with one or more embodiments of the invention.

While the various steps in the flowchart shown in FIG. 2C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 230, the document annotator obtains a request to generate a field prediction. In one or more embodiments of the invention, the field generation request is provided to the document annotator by the document manager using any appropriate method of data transmission without departing from the invention. As an example, the document manager may communicate the field prediction generation request as network data traffic units over a series of network devices that operatively connect to the document manager and the document annotator. The field prediction generation request may include the field identifier associated with the field in which field prediction model will predict the field value.

In Step 232, the document annotator obtains a live document from the data manager. In one or more embodiments of the invention, the live document is provided to the document annotator by the document manager using any appropriate method of data transmission without departing from the invention. As an example, the document manager may communicate the live document as network data traffic units over a series of network devices that operatively connect to the document manager and the document annotator. As another example, the document manager may perform network file transfers using any network file transfer protocol to transfer the live document to the document annotator.

In Step 234, a determination is made as to whether the live document is a text-based document. As discussed above the documents may be text-based document or image-based documents. Text-based documents may include text data and image-based documents may include image data. The document annotator may determine whether the live document is a text-based document by checking the data included in the live document.

In one or more embodiments of the invention, if the document annotator identifies that the live document includes text data, then the document annotator may determine that live document is a text-based document. In one or more embodiments of the invention, if the document annotator identifies that the live document does not include text data (i.e., the document includes image data), then the document annotator may determine that the live document is not a text-based document (i.e., the document is an image-based document).

In one or more embodiments of the invention, if the document annotator determines that the live document is a text-based document, then the method proceeds to Step 236. In one or more embodiments of the invention, if the document annotator determines that the live document is not a text-based document, then the method proceeds to Step 238.

In Step 236, the document annotator performs text-based data extraction to identify words and boxes included in the live document. The document annotator may perform any appropriate method of text-based data extraction without departing from the invention. As an example, the document annotator may use pdfplummer to perform text-based data extraction. As a result, the document annotator may identify every word (i.e., set of alphanumeric characters) included in the live document and box associated with each word. A box may specify the location of a word in the document. The location may include positional information relative to the document and page size (e.g., page coordinates associated with each corner of a rectangular box).

In one or more embodiments of the invention, the method proceeds to Step 240 following step 236.

In Step 238, the document annotator performs non-text-based data extraction to identify words and boxes included in the live document. The non-text-based data extraction may include image-based data extraction. The document annotator may perform any appropriate method of non-text-based data extraction without departing from the invention. As an example, the document annotator may use optical character recognition techniques to perform non-text-based data extraction. As a result, the document annotator may identify every word (i.e., set of alphanumeric characters) included in the live document and a box associated with each word. A box may specify the location of a word in the document. The location may include positional information relative to the document and page size (e.g., page coordinates associated with each corner of a rectangular box).

In Step 240, the document annotator identifies keywords and candidate words included in the document using the identified words and boxes. In one or more embodiments of the invention, the document annotator uses the list of keywords associated included in the entry of the field keyword repository associated with the field identifier included in the field prediction model generation request obtained in Step 200 to identify keywords. The document annotator may identify any word included in the document that matches a keyword of the list of keywords as a keyword and may specify which keyword it matches.

In one or more embodiments of the invention, the document annotator uses the alphanumeric character parameters included in the entry of the field candidate word repository associated with the field identifier included in the field prediction model generation request obtained in Step 200 to identify candidate words. The document annotator may identify any word included in the document that satisfies the alphanumeric character parameters as a candidate word.

In Step 240, the document annotator identifies keywords and candidate words included in the live document using the identified words and boxes. In one or more embodiments of the invention, the document annotator uses the list of keywords associated included in the entry of the field keyword repository associated with the field identifier included in the field prediction generation request obtained in Step 230 to identify keywords. The document annotator may identify any word included in the live document that matches a keyword of the list of keywords as a keyword and may specify which keyword it matches.

In one or more embodiments of the invention, the document annotator uses the alphanumeric character parameters included in the entry of the field candidate word repository associated with the field identifier included in the field prediction generation request obtained in Step 230 to identify candidate words. The document annotator may identify any word included in the live document that satisfies the alphanumeric character parameters as a candidate word.

In Step 242, an annotated live document is generated to include color-based representation masks for the identified keywords, the identified candidate words, and general words. In one or more embodiments of the invention, the document annotator generates color-based representation masks by coloring the boxes associated with the identified keywords, the identified candidate words, and general words. The document annotator may color keywords a first color, candidate words a second color, and general words (i.e., all words that are not keywords or candidate words) a third color. The document annotator may color each keyword included in the live document a different shade of the first color. The field keyword repository entry associated with the field may specify a shade of the first color associated with each keyword included in the list of keywords. For example, all candidate words may be colored blue, all general words may be colored white, and each keyword may be colored a different shade of green.

In Step 244, the annotated live document is provided to the field predictor. In one or more embodiments of the invention, the document annotator provides the annotated live document to the field predictor. The annotated live document may be sent to the field predictor using any appropriate method of data transmission without departing from the invention. As an example, the document annotator may communicate the annotated live document as network data traffic units over a series of network devices that operatively connect to the document annotator and the field predictor. As another example, the document annotator may perform network file transfers using any network file transfer protocol. As a further example, the document annotator may store the annotated live document in the document repository of the persistent storage of the field prediction system. The document annotator may provide a reference (e.g., a pointer) to the annotated live document to the field predictor.

In Step 246, the field predictor generates a field prediction using the annotated live document and a field prediction model. In one or more embodiments of the invention, the field predictor identifies the field prediction model associated with the targeted field using the field identifier included in the field prediction generation request obtained in Step 230. The field predictor may input the annotated live document into the field prediction model to generate a field prediction. The field prediction may include a location of the predicted field value and a confidence percentage associated with the predicted field value. The location may include positional information relative to the document and page size (e.g., page numbers and page coordinates associated with each corner of a rectangular box that includes the predicted field value). The field predictor may provide the field prediction and the live document to the document manager. A user of the document manager may confirm the generated field prediction.

In one or more embodiments of the invention, the method may end following step 246.

Example

Figure 3A:
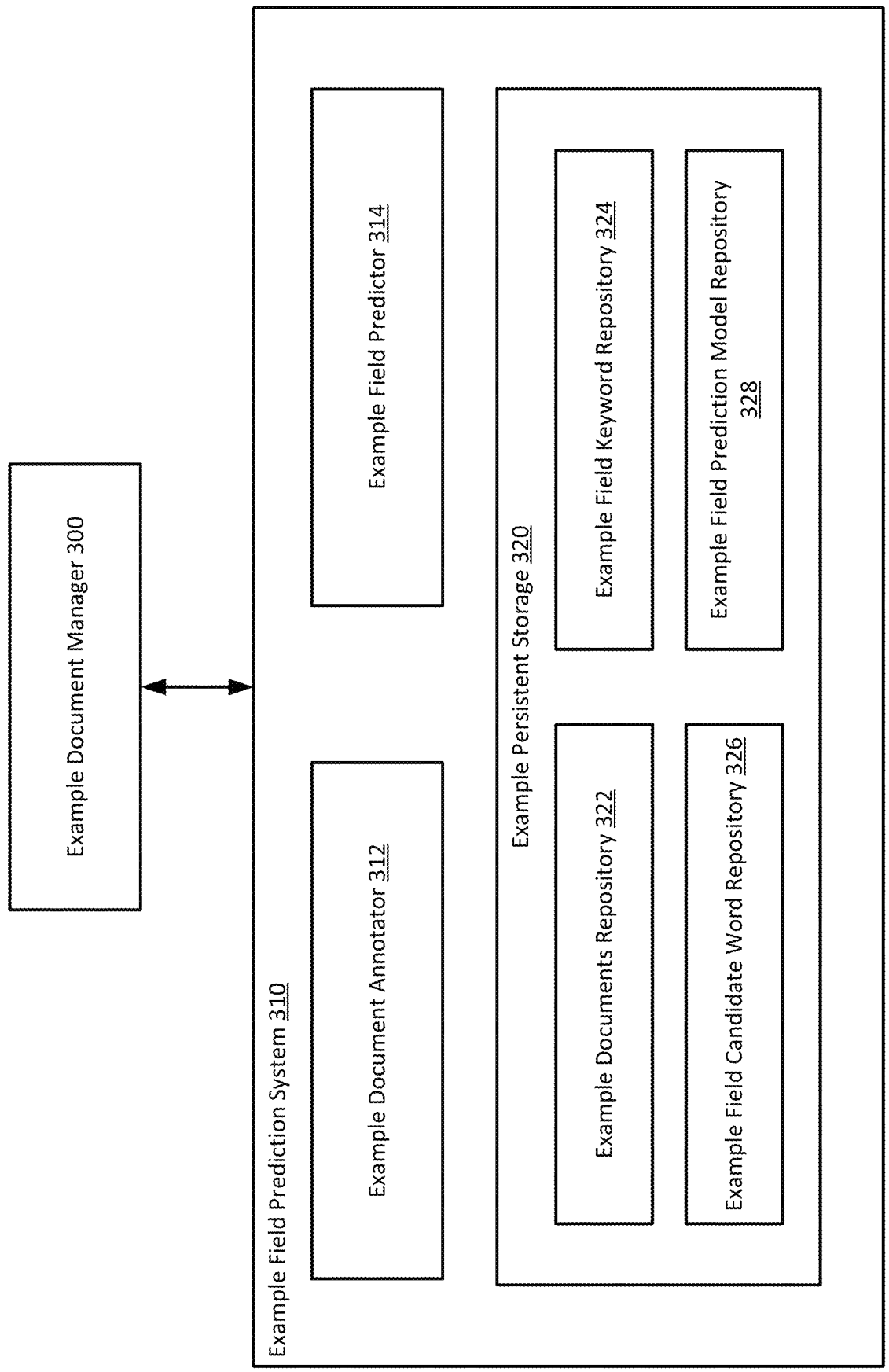

FIGS. 3A-3B show an example in accordance with one or more embodiments described herein. The following example is for explanatory purposes only and not intended to limit the scope of embodiments described herein. Additionally, while the example shows certain example aspects of embodiments described herein and in FIG. 1A, all possible aspects of such embodiments may not be illustrated in this particular example. This example is intended to be a simple example for discussion purposes to illustrate, at least in part, concepts described herein.

Referring to FIG. 3A, consider a scenario in which a user of an example data manager processes documents from customers (e.g., clients). The documents are purchase orders. The customer may send large quantities of purchase orders to the example document manager, which each purchase order associated with a different layout and structure. As a result, the user of the example data manager desires to improve the efficiency of processing purchase orders from the customers. Therefore, an example field prediction system is deployed to generate field predictions for the example document manager.

In such a scenario, the user of the example document manager (300) initiates the generation of a field prediction model that generates field predictions of customer numbers for purchase orders. The example document annotator (312) of the example field prediction system (310) obtains a field prediction model generation request from the example document manager (300). The field generation request specifies that the field is customer numbers. The example document manager (300) also provides training documents to the example document annotator (312). After obtaining the training documents, the example document annotator (312) generates annotated training documents.

To generate annotated training documents, for each training document, the example document annotator (312): (i) performs text-based data extraction (e.g., pdfplumber) or non-text-based data extraction (e.g., OCR) on the training document, (ii) identifies words and boxes included in the training document, (iii) identifies keywords and candidate words associated with customer numbers using the customer number entries of the example field keyword repository (324) and the example field candidate word repository (326), and (iv) generates an annotated training document that includes color-based representation masks associated with identified keywords, the identified candidate words, and general words. An example annotated training document is illustrated in FIG. 3B.

Turning to FIG. 3B, FIG. 3B shows an example annotated training document (330). The example annotated training document has four keywords. The first keyword, keyword A (332) is "ID Number" and is associated with a first green, green A. The second keyword, keyword B (336) is "Customer" and is associated with a second green, green B. The third keyword, keyword C (344) is "Customer Number" and is associated with a third green, green C. The fourth keyword, keyword D (352) is "Company" and is associated with a fourth green, green D.

The example annotated training document includes three candidate words that satisfy the alphanumeric character parameters. The alphanumeric character parameters specify that the candidate words include numeric characters only and may be between three and five characters long. The first candidate word, candidate word A (334) is "111" and is associated with blue. The second candidate word, candidate word B (348) is "00169" and is associated with blue. The candidate word B (348) is the actual customer number included in the training document. The third candidate word, candidate word C (354) is "001" and is associated with blue.

The rest of the words included in the example annotated training document (330) are general words and include general word A (338), general word B (340), general word C (342), general word D (346), general word E (350), general word F (356), general word G (358), and general word H (360). All general words are associated with the color white.

The example document annotator (312) stores the annotated training documents in the example document repository (322) and provide the storage locations of the annotated training documents to the example field predictor (314). The example field predictor (314) obtains the annotated training documents from the example documents repository (322) of the example persistent storage (320) using the storage locations. The example field predictor (314) then generates a field prediction model using a portion of the annotated training documents and a neural network deep learning algorithm. The field prediction model includes the functionality to generate field predictions of customer numbers for purchase orders. The example field predictor (314) performs model verification on the generated field prediction model using the remaining portion of the annotated training documents and determines that the model performance of the field prediction model is acceptable. The example field predictor (314) stores the field prediction model in the example field prediction model repository (328) of the example persistent storage (320). The example field predictor (314) then notifies the user of the example document manager (300) that the field prediction model has been generated.

At some point in time later, the user of the example document manager (300) obtains a purchase order from a customer. The example document manager (300) provides the purchase order to the example document annotator (312) of the field prediction system along with a request to generate a field prediction of the customer number of the purchase order. In response to obtaining the purchase order and the field prediction generation request, the example document annotator (312) generates an annotated purchase order by: (i) performing non-text-based data extraction (e.g., OCR) on the purchase order (i.e., the purchase order is a scanned PDF), (ii) identifying words and boxes included in the purchase order, (iii) identifying keywords and candidate words associated with customer numbers using the customer number entries of the example field keyword repository (324) and the example field candidate word repository (326), and (iv) generating the annotated purchase order by including color-based representation masks associated with the identified keywords, the identified candidate words, and general words.

The example document annotator (312) may provide the annotated purchase order to the example field predictor (314). The example field predictor (314) may use the field prediction model associated with customer numbers to generate a field prediction. The field prediction may include the location of a box that is predicted to include the customer number on the purchase order and a confidence percentage of 95%. The example field predictor (314) provides the field prediction of the customer number and the purchase order to the example document manager (300). The user of the example document manager (300) verifies that the field prediction is correct.

End of Example

Figure 4:
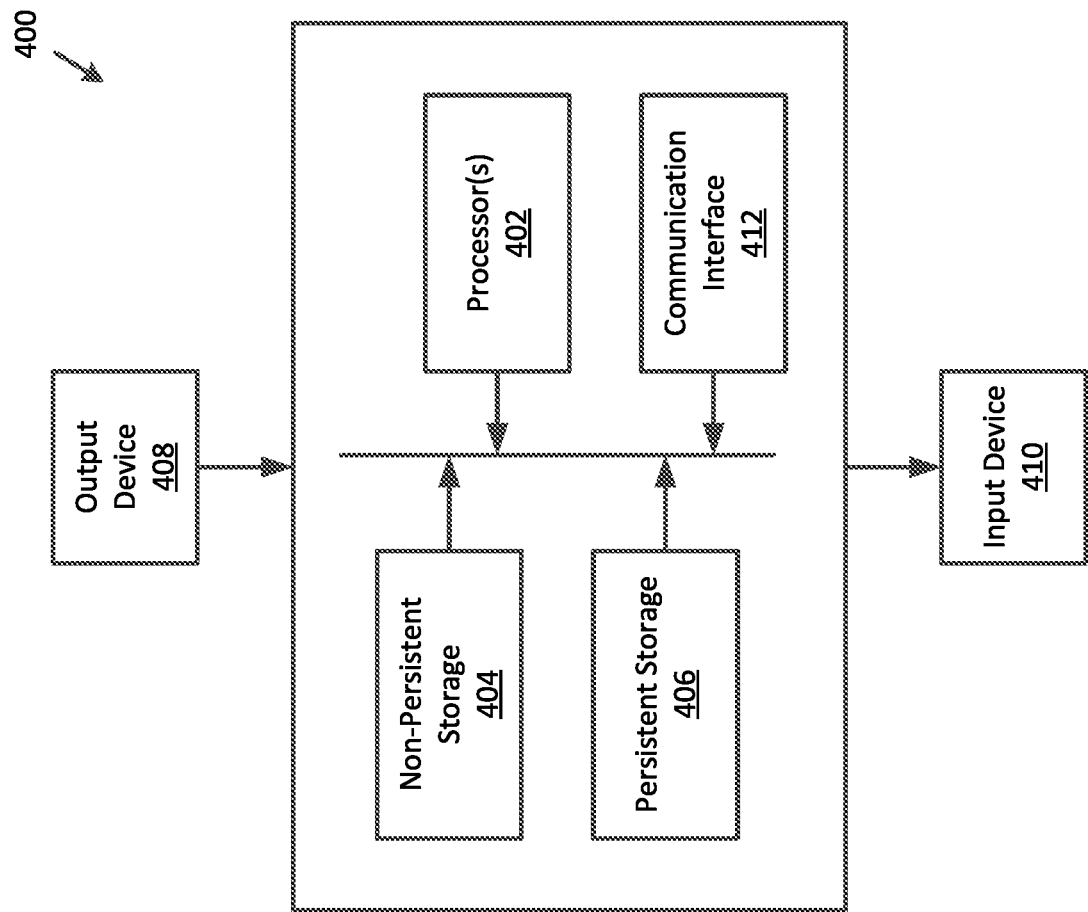
FIG. 4 shows a computing system in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments described herein use a field prediction system to automatically field predictions for documents. The field prediction system may include a document annotator that generates annotated documents using documents obtained from a document manager. The annotated document may include color-coded representation masks associated with keywords and candidate words which may be associated with a particular field of interest and general words that are unlikely to be associated with the particular field of interest. The field prediction system may further include a field predictor that may use the annotated documents to train field prediction models and to generate field predictions.

In one or more embodiments of the invention, the document annotator generates annotated documents that may be used to train field prediction models, resulting in field prediction models that may accurately and efficiently predict field values in highly variable and unstructured documents with minimal user involvement.

The problems discussed above should be understood as being examples of problems solved by embodiments of the invention, and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for predicting field values of documents, the method comprising:
   identifying, by a document annotator, a field prediction model generation request;
   in response to identifying the field prediction model generation request:
   obtaining, by the document annotator, training documents from a document manager;
   selecting, by the document annotator, a first training document of the training documents;
   making a first determination, by the document annotator, that the first training document is a text-based document; and in response to the first determination:
- performing, by the document annotator, text-based data extraction to identify first words and first boxes included in the first training document;
- identifying, by the document annotator, first keywords and first candidate words included in the first training document based on the first words and first boxes, wherein the first keywords specify words associated with a field, and wherein the first candidate words specify potential field values of the field; and
- generating, by the document annotator, a first annotated training document using the first keywords and the first candidate words, wherein the first annotated training document comprises color-based representation masks for the first keywords, the first candidate words, and first general words included in the first training document.

2. The method of claim 1, wherein the color-based representation masks comprise:
a first color associated with the first candidate words;
a second color associated with the first general words; and
and a plurality of shades of a third color associated with the first keywords.

3. The method of claim 2, wherein each keyword of the first keywords is associated with a shade of the plurality of the shades of the third color.

4. The method of claim 1, further comprising:
after generating the first annotated training document:
- making a second determination, by the document annotator, that there is an additional document in the training documents;
- in response to the second determination:
  - selecting, by the document annotator, a second training document of the training documents;
  - making a third determination, by the document annotator, that the second training document is not a text-based document; and
  - in response to the third determination:
    - performing, by the document annotator, non-text-based data extraction to identify second words and second boxes included in the second training document;
    - identifying, by the document annotator, second keywords and second candidate words included in the second training document based on the second words and the second boxes;
    - generating, by the document annotator, a second annotated training document using the second keywords and the second candidate words, wherein the second annotated training document comprises color-based representation masks for the second keywords, the second candidate words, and second general words included in the second training document; and
    - sending, by the document annotator, the first annotated training document and the second annotated training document to a field predictor.

5. The method of claim 4, further comprising:
after sending the first annotated training document and the second annotated training document to the field predictor:
- generating, by the field predictor, a field prediction model using a deep learning algorithm, the first annotated training document, and the second annotated training document.

6. The method of claim 5, further comprising:
obtaining, by the document annotator, a request to generate a field prediction;
in response to obtaining the request to generate a field prediction:
- obtaining a live document from the document manager;
- making a fourth determination that the live document is a text-based document; and
- in response to the fourth determination:
  - performing text-based data extraction to identify third words and third boxes included in the live document;
  - identifying third keywords and third candidate words included in the live document based on the third words and the third boxes;
  - generating an annotated live document that comprises color-based representation masks for the third keywords, the third candidate words, and third general words included in the live document;
  - sending the live document to the field predictor; and
  - generating, by the field predictor, the field prediction using the live annotated document and the field prediction model.

7. The method of claim 6, wherein the field prediction comprises:
a location of a predicted field value in the live annotated document; and
a confidence percentage associated with the location of the predicted field value.

8. A non-transitory computer readable medium comprising computer readable program code, which when executed by a computer processor enables the computer processor to perform a method for predicting field values of documents, the method comprising:
identifying, by a document annotator, a field prediction model generation request;
in response to identifying the field prediction model generation request:
- obtaining, by the document annotator, training documents from a document manager;
- selecting, by the document annotator, a first training document of the training documents;
- making a first determination, by the document annotator, that the first training document is a text-based document; and
- in response to the first determination:
  - performing, by the document annotator, text-based data extraction to identify first words and first boxes included in the first training document;
  - identifying, by the document annotator, first keywords and first candidate words included in the first training document based on the first words and first boxes, wherein the first keywords specify words associated with a field, and wherein the first candidate words specify potential field values of the field; and
  - generating, by the document annotator, a first annotated training document using the first keywords and the first candidate words, wherein the first annotated training document comprises color-based representation masks for the first keywords, the first candidate words, and first general words included in the first training document.

9. The non-transitory computer readable medium of claim 8, wherein the color-based representation masks comprise:
a first color associated with the first candidate words;
a second color associated with the first general words; and and a plurality of shades of a third color associated with the first keywords.

10. The non-transitory computer readable medium of claim 9, wherein each keyword of the first keywords is associated with a shade of the plurality of the shades of the third color.

11. The non-transitory computer readable medium of claim 8, wherein the method further comprises:
after generating the first annotated training document:
making a second determination, by the document annotator, that there is an additional document in the training documents;
in response to the second determination:
selecting, by the document annotator, a second training document of the training documents;
making a third determination, by the document annotator, that the second training document is not a text-based document; and
in response to the third determination:
performing, by the document annotator, non-text-based data extraction to identify second words and second boxes included in the second training document;
identifying, by the document annotator, second keywords and second candidate words included in the second training document based on the second words and the second boxes;
generating, by the document annotator, a second annotated training document using the second keywords and the second candidate words, wherein the second annotated training document comprises color-based representation masks for the second keywords, the second candidate words, and second general words included in the second training document; and
sending, by the document annotator, the first annotated training document and the second annotated training document to a field predictor.

12. The non-transitory computer readable medium of claim 11, wherein the method further comprises:
after sending the first annotated training document and the second annotated training document to the field predictor:
generating, by the field predictor, a field prediction model using a deep learning algorithm, the first annotated training document, and the second annotated training document.

13. The non-transitory computer readable medium of claim 12, wherein the method further comprises:
obtaining, by the document annotator, a request to generate a field prediction;
in response to obtaining the request to generate a field prediction:
obtaining a live document from the document manager;
making a fourth determination that the live document is a text-based document; and
in response to the fourth determination:
performing text-based data extraction to identify third words and third boxes included in the live document;
identifying third keywords and third candidate words included in the live document based on the third words and the third boxes;
generating an annotated live document that comprises color-based representation masks for the third keywords, the third candidate words, and third general words included in the live document;
sending the live document to the field predictor; and
generating, by the field predictor, the field prediction using the live annotated document and the field prediction model.

14. The non-transitory computer readable medium of claim 13, wherein the field prediction comprises:
a location of a predicted field value in the live annotated document; and
a confidence percentage associated with the location of the predicted field value.

15. A system for predicting field values of documents, the system comprising:
a field prediction system comprising a document annotator comprising a processor and memory, and configured to:
identify a field prediction model generation request;
in response to identifying the field prediction model generation request:
obtain training documents from a document manager;
select a first training document of the training documents;
make a first determination that the first training document is a text-based document; and
in response to the first determination:
perform text-based data extraction to identify first words and first boxes included in the first training document;
identify first keywords and first candidate words included in the first training document based on the first words and first boxes, wherein the first keywords specify words associated with a field, and wherein the first candidate words specify potential field values of the field; and
generate a first annotated training document using the first keywords and the first candidate words, wherein the first annotated training document comprises color-based representation masks for the first keywords, the first candidate words, and first general words included in the first training document.

16. The system of claim 15, wherein the color-based representation masks comprise:
a first color associated with the first candidate words;
a second color associated with the first general words; and
and a plurality of shades of a third color associated with the first keywords.

17. The system of claim 16, wherein each keyword of the first keywords is associated with a shade of the plurality of the shades of the third color.

18. The system of claim 15, wherein the document annotator is further configured to:
after generating the first annotated training document:
make a second determination that there is an additional document in the training documents;
in response to the second determination:
select a second training document of the training documents;
make a third determination that the second training document is not a text-based document; and
in response to the third determination:
perform non-text-based data extraction to identify second words and second boxes included in the second training document;
identify second keywords and second candidate words included in the second training document based on the second words and the second boxes;

generate a second annotated training document using the second keywords and the second candidate words, wherein the second annotated training document comprises color-based representation masks for the second keywords, the second candidate words, and second general words included in the second training document; and send the first annotated training document and the second annotated training document to a field predictor of the field prediction system.

19. The system of claim 18, wherein the field predictor is configured to:

after obtaining the first annotated training document and the second annotated training document from the document annotator:

generate a field prediction model using a deep learning algorithm, the first annotated training document, and the second annotated training document.

20. The system of claim 19, wherein the document annotator is further configured to:

obtain a request to generate a field prediction;

in response to obtaining the request to generate a field prediction:

obtain a live document from the document manager;

make a fourth determination that the live document is a text-based document; and in response to the fourth determination:

perform text-based data extraction to identify third words and third boxes included in the live document;

identify third keywords and third candidate words included in the live document based on the third words and the third boxes;

generate an annotated live document that comprises color-based representation masks for the third keywords, the third candidate words, and third general words included in the live document; and send the live document to the field predictor, wherein the field predictor is further configured to generate the field prediction using the live annotated document and the field prediction model.

* * * * *